US008673169B2

(12) United States Patent
Sato et al.

(10) Patent No.: US 8,673,169 B2
(45) Date of Patent: Mar. 18, 2014

(54) LUBRICANT COMPOSITION FOR REFRIGERATING MACHINE

(75) Inventors: Tokue Sato, Ichihara (JP); Masato Kaneko, Ichihara (JP); Harutomo Ikeda, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 478 days.

(21) Appl. No.: 12/919,412

(22) PCT Filed: Mar. 6, 2009

(86) PCT No.: PCT/JP2009/054251
§ 371 (c)(1),
(2), (4) Date: Aug. 25, 2010

(87) PCT Pub. No.: WO2009/110584
PCT Pub. Date: Sep. 11, 2009

(65) Prior Publication Data
US 2011/0000253 A1    Jan. 6, 2011

(30) Foreign Application Priority Data

Mar. 7, 2008 (JP) .................................. 2008-058188
Mar. 11, 2008 (JP) .................................. 2008-061851

(51) Int. Cl.
C09K 5/04 (2006.01)
F25B 47/00 (2006.01)

(52) U.S. Cl.
USPC ................................ 252/68; 508/579; 62/468

(58) Field of Classification Search
USPC ................................ 252/68; 508/579; 62/468
See application file for complete search history.

(56) References Cited

U.S. PATENT DOCUMENTS

| 5,021,179 | A | 6/1991 | Zehler et al. | |
| 5,156,768 | A | 10/1992 | Thomas et al. | |
| 5,454,966 | A | 10/1995 | Thomas et al. | |
| 5,648,016 | A | 7/1997 | Klug et al. | |
| 7,914,697 | B2 * | 3/2011 | Kaneko ........................... | 252/68 |
| 8,043,523 | B2 * | 10/2011 | Kaneko ........................... | 252/68 |
| 8,137,577 | B2 * | 3/2012 | Kaneko et al. .................. | 252/68 |
| 2005/0233923 | A1 | 10/2005 | Singh et al. | |
| 2007/0149416 | A1 * | 6/2007 | Kaneko ........................... | 508/279 |
| 2007/0187639 | A1 * | 8/2007 | Leck et al. ...................... | 252/68 |
| 2007/0272893 | A1 * | 11/2007 | Kaneko ........................... | 252/68 |
| 2009/0062567 | A1 * | 3/2009 | Kaneko ........................... | 508/279 |
| 2009/0090128 | A1 * | 4/2009 | Kaneko ........................... | 62/498 |
| 2009/0159836 | A1 * | 6/2009 | Kaneko ........................... | 252/68 |
| 2009/0270295 | A1 * | 10/2009 | Kaneko ........................... | 508/579 |
| 2009/0277212 | A1 * | 11/2009 | Kaneko et al. .................. | 62/468 |
| 2010/0029522 | A1 * | 2/2010 | Tokiai et al. ................... | 508/462 |
| 2010/0108936 | A1 * | 5/2010 | Kaneko ........................... | 252/68 |
| 2010/0133463 | A1 * | 6/2010 | Kaneko et al. .................. | 252/68 |
| 2010/0147016 | A1 * | 6/2010 | Kaneko et al. .................. | 62/468 |
| 2010/0175421 | A1 * | 7/2010 | Kaneko et al. .................. | 62/468 |
| 2010/0176333 | A1 * | 7/2010 | Tokiai et al. ................... | 252/68 |

FOREIGN PATENT DOCUMENTS

| CN | 1354776 A | 6/2002 |
| CN | 1965049 A | 5/2007 |
| DE | 26 38 324 A1 | 3/1977 |
| JP | 3 52995 | 3/1991 |
| JP | 3 275799 | 12/1991 |
| JP | 4 81495 | 3/1992 |
| JP | 4 110388 | 4/1992 |
| JP | 5 17792 | 1/1993 |
| JP | 5 279658 | 10/1993 |
| JP | 6 1970 | 1/1994 |
| JP | 7 507342 | 8/1995 |
| JP | 9-118890 | 5/1997 |
| JP | 10 8078 | 1/1998 |
| JP | 2901369 | 6/1999 |
| JP | 2000 96075 | 4/2000 |
| JP | 2000 154390 | 6/2000 |
| JP | 2002 356694 | 12/2002 |
| JP | 2006 503961 | 2/2006 |
| JP | 2006 512426 | 4/2006 |
| JP | 2007-510039 A | 4/2007 |
| JP | 2007 137953 | 6/2007 |
| JP | 2007-532766 A | 11/2007 |
| JP | 2007 532767 | 11/2007 |
| JP | 2008 208261 | 9/2008 |
| TW | 200706522 A | 2/2007 |
| WO | 92 17563 | 10/1992 |
| WO | WO 92/17559 A1 | 10/1992 |
| WO | WO 92/17560 A1 | 10/1992 |
| WO | 00 60021 | 10/2000 |
| WO | 2004 037752 | 5/2004 |
| WO | 2004 037913 | 5/2004 |
| WO | 2005 103190 | 11/2005 |
| WO | 2005 103191 | 11/2005 |
| WO | WO 2006/069362 A2 | 6/2006 |
| WO | 2006 094303 | 9/2006 |

(Continued)

OTHER PUBLICATIONS

Extended European Search Report issued on Sep. 27, 2011 in the corresponding European Application No. 09718337.0.
U.S. Appl.No. 12/744,448, filed May 24, 2010, Sato, et al.
U.S. Appl. No. 12/744,285, filed May 21, 2010, Kaneko, et al.
Office Action issued Nov. 27, 2012 in Japanese Patent Application No. 2008-061851 (with English-language translation).
Combined Chinese Office Action and Search Report issued Oct. 10, 2012, in Patent Application No. 200980108648.8 (with English-language translation).
Chinese Office Action issued Apr. 1, 2013, in China Patent Application No. 200980108648.8 (with English translation).
Taiwanese Patent Application No. 098107343, with English Abstract, Nov. 27, 2013.

(Continued)

*Primary Examiner* — Douglas McGinty
(74) *Attorney, Agent, or Firm* — Oblon, Spivak, McClelland, Maier & Neustadt, L.L.P.

(57) ABSTRACT

A lubricating oil composition for refrigerator is provided by adding base oil with biphenols selected from 4,4'-methylenebis(2,6-di-t-butyl-phenol), 2'2-methylenebis(4-methyl-6-t-butylphenol), 2,2'-methylenebis(4-ethyl-6-t-butylphenol) and 4,4'-butylidenebis(3-methyl-6-t-butylphenol).

13 Claims, No Drawings

(56) References Cited

FOREIGN PATENT DOCUMENTS

| WO | 2007 002625 | 1/2007 |
| WO | 2007 029746 | 3/2007 |
| WO | WO 2007/026647 A1 | 3/2007 |
| WO | 2007 105452 | 9/2007 |
| WO | WO 2007105452 A1 * | 9/2007 |

* cited by examiner

LUBRICANT COMPOSITION FOR REFRIGERATING MACHINE

TECHNICAL FIELD

The present invention relates to a lubricating oil composition for refrigerator used in a compression freezer(s) of various freezer fields.

BACKGROUND ART

Typically, a compression freezer includes a compressor, a condenser, an expansion valve and an evaporator. Within an enclosed system of the compression freezer, a liquid mixture of a refrigerant and lubricating oil is circulated. Examples of a refrigerant conventionally used in many of such compression freezers are dichlorodifluoromethane (R12) and chlorodifluoromethane (R22). On the other hand, examples of the lubricating oil conventionally used therein are a variety of mineral oil and synthetic oil.

However, chlorofluorocarbon such as R12 and hydrochlorofluorocarbon such as R22 may bring about an environmental pollution such as destruction of the stratospheric ozone layer, a use of which has been more strictly regulated on a global scale in recent years. Thus, a hydrogen-containing chlorofluorocarbon compound such as hydrofluorocarbon is attracting more and more attentions as a new refrigerant. Such a hydrogen-containing chlorofluorocarbon compound, especially hydrofluorocarbon represented by R134a, is a preferable refrigerant for compression freezers not only because the compound does not destroy the ozone layer but also because the compound can be used in conventional freezers in place of conventional R12 or the like without requiring changes in configurations of the conventional freezers (e.g., see Patent Document 1).

On the other hand, since hydrofluorocarbon may also bring about an impact on the environment in terms of global warming, a so-called natural refrigerant such as carbon dioxide or ammonia is also attracting more and more attractions as an alternative refrigerant that is more suitable for environmental protection. Refrigerator oil using such a natural refrigerant has been also proposed (e.g., see Patent Document 2). In addition, a refrigerant having a specific polar structure in its molecule such as an unsaturated fluorohydrocarbon compound, a fluoroether compound, a fluoroalcohol compound or a fluoroketone compound has been found to have lower global warming potential (e.g., see Patent Document 3 and Patent Document 4).

Patent Document 1: JP-A-10-008078
Patent Document 2: JP-2000-96075
Patent Document 3: JP-T-2006-503961
Patent Document 4: JP-T-07-507342

DISCLOSURE OF THE INVENTION

Problems to be Solved by the Invention

However, the refrigerator oil disclosed in Patent Document 1 or 2 is not necessarily sufficiently superior in terms of energy saving. For instance, even when the refrigerator oil is used in a freezer such as a car air-conditioner or an electric refrigerator, friction between an aluminum product and a steel product of the freezer remains large, which is not favorable in terms of energy saving. In addition, since a great variety of refrigerants are available as described above, it has been difficult to provide refrigerator oil that is widely applicable to freezers each of which employs a different refrigerant. In particular, while refrigerator lubricating oil using the refrigerant disclosed in Patent Document 3 or 4 is required to be excellently compatible with the refrigerant and excellently stable, a sufficiently stable lubricating oil has not been provided yet.

An object of the invention is to provide a lubricating oil composition for refrigerator, the composition having lower global warming potential and excellent stability for application in freezers that use a variety of refrigerants currently usable in, for instance, car air-conditioning systems such as saturated or unsaturated fluorohydrocarbon, carbon dioxide, hydrocarbon and ammonium.

Means for Solving the Problems

In view of the above, according to an aspect of the present invention, lubricating oil compositions for refrigerator as follows are provided:

[1] a lubricating oil composition for refrigerator, containing: a base oil; and an additive added to the base oil, wherein the additive is bisphenols;

[2] the lubricating oil composition for refrigerator, in which the biphenols is at least one of 4,4'-methylenebis(2,6-di-t-butyl-phenol), 2-2'-methylenebis(4-methyl-6-t-butylphenol), 2,2'-methylenebis(4-ethyl-6-t-butylphenol) and 4,4'-butylidenebis(3-methyl-6-t-butylphenol);

[3] the lubricating oil composition for refrigerator, used for at least one refrigerant selected from saturated fluorohydrocarbon, carbon dioxide, hydrocarbon, ammonia and a fluorine-containing organic compound represented by a molecular formula (A) as follows, $$C_pO_qF_rR_s \quad (A)$$

where: R represents Cl, Br, I or hydrogen; p is an integer of 1 to 6; q is an integer of 0 to 2; r is an integer of 1 to 14; and s is an integer of 0 to 13, on condition that when q is 0, p is an integer of 2 to 6 and one or more unsaturated carbon-carbon bond is contained in the molecule;

[4] the lubricating oil composition for refrigerator, in which a compound represented by the molecular formula (A) is unsaturated fluorohydrocarbon having 2 or 3 carbon atoms;

[5] the lubricating oil composition for refrigerator, in which the base oil is at least either one of mineral oil and synthetic base oil, and the synthetic base oil is at least one selected from alkyl benzene, alkyl naphthalene, poly-α-olefin, polyvinyl ether, polyalkylene glycol, polycarbonate, polyol ester and an ether-base compound represented by a formula (1) as follows,

$$Ra-[(ORb)n-(B)-(ORc)k]x-Rd \quad (1)$$

where: Ra and Rd each represent a hydrogen atom, an alkyl group having 1 to 10 carbon atoms, an acyl group having 2 to 10 carbon atoms or a hydrocarbon group having 2 to 6 bonding sites and 1 to 10 carbon atoms; Rb and Rc each represent an alkylene group having 2 to 4 carbon atoms; n and k each represent an integer of 0 to 20; x represents an integer of 1 to 6; and (B) represents a polymerization site containing 3 or more monomer units each represented by a formula (2) as follows,

[Chemical Formula 1]

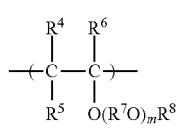

(2)

where: $R^4$, $R^5$ and $R^6$ each represent a hydrogen atom or a hydrocarbon group having 1 to 8 carbon atoms, $R^4$, $R^5$ and $R^6$ being allowed to be mutually the same or different; $R^7$ represents a divalent hydrocarbon group having 1 to 10 carbon atoms or ether-bonded oxygen-containing divalent hydrocarbon group having 2 to 20 carbon atoms; $R^8$ represents a hydrogen atom or a hydrocarbon group having 1 to 20 carbon atoms; m represents a number whose average value is in a range of 0 to 10; when m is plural, the plural m are allowed to be mutually the same or different per unit; $R^4$ to $R^8$ each are allowed to be mutually the same or different per unit; when $R^7O$ is plural, the plural $R^7O$ are allowed to be mutually the same or different; and when both k and n in the formula (1) are 0, m in the formula (2) is an integer of 1 or more;

[6] the lubricating oil composition for refrigerator, in which the base oil is further added with at least one additive selected from an extreme pressure agent, an oiliness agent, an acid scavenger, a metal deactivator and an antifoaming agent;

[7] the lubricating oil composition for refrigerator, in which a slide portion of the refrigerator is made of engineering plastic or the slide portion has an organic coating layer or an inorganic coating layer;

[8] the lubricating oil composition for refrigerator, in which the organic coating layer is a coating layer of polytetrafluoroethylene, a coating layer of polyimide, a coating layer of polyamide-imide or a thermosetting insulation layer formed with use of a resin paint containing: a resin base material made of polyhydroxyether resin and polysulfone-base resin; and a cross-linker;

[9] the lubricating oil composition for refrigerator, in which the inorganic coating layer is a graphite layer, a diamond-like carbon layer, a tin layer, a chrome layer, a nickel layer or a molybdenum layer;

[10] the lubricating oil composition for refrigerator, used in open-type car air-conditioners, electric driven car air-conditioners, gas heat pumps, air conditioning devices, refrigerators, vending machines, showcases, various hot-water supply systems or cooling/heating systems; and

[11] the lubricating oil composition for refrigerator, in which a water content within the system is 500 ppm by mass or less while a residual air partial pressure is 13 kPa or less.

Since bisphenols are added to the base oil as an additive in the lubricating oil composition for refrigerator according to the aspect of the invention, the refrigerator oil composition can scavenge molecular oxygen present in minute amounts in a freezing system, thereby preventing oxygen from reacting with the refrigerant. Accordingly, the lubricating oil composition for refrigerator according to the aspect of the invention is stably usable for a long time. Particularly, the lubricating oil composition can considerably excellently suppress degradation of the refrigerator oil due to air (oxygen) residual in an open-type freezing system. In addition, even when the refrigerator oil is leaked from a shaft sealing portion, the oil can maintain favorable properties for a long time without thickening or solidifying.

The lubricating oil composition for refrigerator according to the aspect of the invention is favorably applicable to car air-conditioners, electric driven car air-conditioners, gas heat pumps, air conditioning devices, refrigerators, vending machines, showcases, various hot-water supply systems and cooling/heating systems, in which an unsaturated chlorofluorocarbon refrigerant readily reactive particularly with oxygen is used.

BEST MODE FOR CARRYING OUT THE INVENTION

A preferred embodiment(s) for implementing the invention will be described below.

The refrigerator oil composition according to the aspect of the invention is provided by adding a base oil with bisphenols.

The base oil may be mineral oil or synthetic base oil. The synthetic base oil is preferably at least one compound exemplarily selected from alkyl benzene, alkyl naphthalene, poly-α-olefin, polyvinyl ether, polyalkylene glycol, polycarbonate, polyol ester and an ether-base compound represented by the formula (2) as above.

First of all, the base oil will be described below.

(1) Mineral Oil

The mineral oil is preferably highly-refined mineral oil, examples of which are: refined oil provided by refining oil fractions in accordance with an ordinary method; deeply-dewaxed oil provided by deeply dewaxing the refined oil fractions; and hydrotreated oil provided by hydrotreating the oil fractions, the oil fractions being provided by atmospherically distilling paraffin-base crude oil, intermediate-base crude oil or naphthene-base crude oil or by vacuum-distilling the residual oil of the atmospherically-distilled oil. The method of refining is not particularly limited but various methods may be employed.

Typically, a treatment such as (a) hydrotreating, (b) dewaxing (solvent-dewaxing or hydrodewaxing), (c) solvent-extracting, (d) alkali-distilling or sulfate-cleaning or (e) clay-treating is singularly performed, or plural methods thereof are combinationally performed in a suitable order. In addition, performing the same treatment at plural times is also effective. For instance, the oil fractions may experience hydrotreating, the oil fractions may initially experience hydrotreating and subsequently alkali-distilling or sulfate-cleaning, the oil fractions may initially experience hydrotreating and subsequently dewaxing, the oil fractions may initially experience solvent-extracting and subsequently hydrotreating, the oil fractions may experience hydrotreating twice or three times, the oil fractions may initially experience hydrotreating twice or three times and subsequently alkali-distilling or sulfate-cleaning, or the oil fractions may initially experience the above-described treatment(s) and subsequently dewaxing again (i.e., deep dewaxing). Among the above-described methods, the mineral oil provided by deep dewaxing is preferable for the highly-refined mineral oil used as the base oil in the invention because such mineral oil is excellent in low-temperature fluidity and free from wax precipitation at low temperatures. According to the deep dewaxing, the oil fractions are solvent-dewaxed under severe conditions or the oil fractions are catalytic-dewaxed using a zeolite catalyst.

For use as the base oil of the refrigerator oil composition according to the aspect of the invention, its kinetic viscosity at 40 degrees C. is preferably 1 to 400 $mm^2/s$, more preferably 5 to 250 $mm^2/s$.

(2) Alkyl Benzene

Examples of the alkyl benzene are any alkyl benzene usable for refrigerator oil, among which alkyl benzene having high viscosity is preferably used for the invention. While there is a variety of such highly-viscous alkyl benzene, alkyl benzene whose alkyl group has 20 or more carbon atoms in total (or alkyl benzene whose plurality of alkyl groups has 20 or more carbon atoms in sum total) such as monoalkyl benzene, dialkyl benzene or trialkyl benzene is preferable. Alkyl benzene having two or more alkyl groups in which 20 or more carbon atoms are contained in sum total (e.g., dialkyl benzene) is more preferably used in terms of thermal stability. As long as kinetic viscosity of the highly-viscous alkyl benzene is within the above-described range, the highly-viscous alkyl benzene may be singularly used or two or more of the above examples may be mixed in use.

For use as the base oil of the refrigerator oil composition according to the aspect of the invention, its kinetic viscosity at 40 degrees C. is preferably 1 to 400 mm$^2$/s, more preferably 5 to 250 mm$^2$/s.

(3) Alkyl Naphthalene

A preferable example of the alkyl naphthalene is alkyl naphthalene whose naphthalene ring is bonded with two or three alkyl groups. Particularly, alkyl naphthalene having 20 or more carbon atoms in total is more preferable in terms of thermal stability. In the invention, the alkyl naphthalene may be singularly used or a mixture thereof may be used.

For use as the base oil of the refrigerator oil composition according to the aspect of the invention, its kinetic viscosity at 40 degrees C. is preferably 1 to 400 mm$^2$/s, more preferably 5 to 250 mm$^2$/s.

(4) Poly-α-Olefin

While there is a variety of usable poly-α-olefin, the poly-α-olefin is typically an α-olefin polymer having 8 to 18 carbon atoms. The poly-α-olefin polymer is preferably a 1-dodecene polymer, a 1-decene polymer or a 1-octene polymer in terms of thermal stability, sealability, lubricity and the like. Among the above, a 1-decene polymer is particularly preferable in that its pour point is low and its viscosity index is high.

In the invention, hydrotreated poly-α-olefin is preferably used as the poly-α-olefin in terms of thermal stability. The poly-α-olefin may be singularly used or a mixture thereof may be used.

For use as the base oil of the refrigerator oil composition according to the aspect of the invention, its kinetic viscosity at 40 degrees C. is preferably 1 to 400 mm$^2$/s, more preferably 5 to 250 mm$^2$/s.

(5) Polyvinyl Ether (PVE)

Examples of the polyvinyl ether-base compound used as the base oil are a compound prepared by polymerizing vinyl ether monomer (hereinafter called as polyvinyl ether I), a compound prepared by copolymerizing vinyl ether monomer and hydrocarbon monomer having olefin double-bond(s) (hereinafter called as polyvinyl ether copolymer II), and a copolymer of polyvinyl ether and alkylene glycol, polyalkylene glycol or monoether thereof (hereinafter called as polyvinyl ether copolymer III).

Examples of vinyl ether monomer used as the material of the polyvinyl ether I are vinyl methyl ether, vinyl ethyl ether, vinyl-n-propyl ether, vinyl isopropyl ether, vinyl-n-butyl ether, vinyl-isobutyl ether, vinyl-sec-butyl ether, vinyl-tert-butyl ether, vinyl-n-pentyl ether, vinyl-n-hexyl ether, vinyl-2-methoxyethyl ether, vinyl-2-ethoxyethyl ether, vinyl-2-methoxy-1-methylethyl ether, vinyl-2-methoxy-propyl ether, vinyl-3,6-dioxaheptyl ether, vinyl-3,6,9-trioxadecyl ether, vinyl-1,4-dimethyl-3,6-dioxaheptyl ether, vinyl-1,4,7-trimethyl-3,6,9-trioxadecyl ether, vinyl-2,6-dioxa-4-heptyl ether, vinyl-2,6,9-trioxa-4-decyl ether, 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, 2-tert-butoxypropene, 1-methoxy-1-butene, 1-ethoxy-1-butene, 1-n-propoxy-1-butene, 1-isopropoxy-1-butene, 1-n-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, 2-isobutoxy-2-butene, 2-sec-butoxy-2-butene and 2-tert-butoxy-2-butene. The above vinyl ether-base monomers can be manufactured by a known method.

One of the above vinyl ether monomers may be singularly used or a combination of two or more thereof may be used.

The vinyl ether monomers listed above each may be also used as the material for the polyvinyl ether copolymer II. One of the above vinyl ether monomers may be singularly used or a combination of two or more thereof may be used.

Examples of the hydrocarbon monomer having olefin double-bond(s), which is the other material of the polyvinyl ether copolymer II, are ethylene, propylene, butenes, pentenes, hexenes, heptenes, octenes, diisobutylene, triisobutylene, styrene, α-methylstyrene and alkyl-substituted styrenes.

One of the above hydrocarbon monomers having olefin double-bond(s) may be singularly used or a combination of two or more thereof may be used. The polyvinyl ether copolymer II may be a block copolymer or a random copolymer.

The polyvinyl ether I and the polyvinyl ether copolymer II can be manufactured exemplarily by the following method.

At the initial stage of the polymerization, a compound prepared by combining Bronsted acids, Lewis acids or organometallic compounds with water, alcohols, phenols, acetals or an adduct of vinyl ethers and a carboxylic acid may be used. Examples of the Bronsted acids are hydrofluoric acid, hydrochloric acid, hydrobromic acid, hydroiodic acid, nitric acid, sulfuric acid, trichloroacetic acid and trifluoroacetic acid. Examples of the Lewis acids are boron trifluoride, aluminum trichloride, aluminum tribromide, tin tetrachloride, zinc dichloride and ferric chloride, among which boron trifluoride is particularly preferable. Examples of the organometallic compounds are diethylaluminum chloride, ethylaluminum chloride and diethylzinc.

An initiating terminal of the polymer, from which the polymerization of the polymer is initiated, is a hydrogen atom when water, alcohols or phenols is used. On the other hand, when acetals is used, the initiating terminal is a hydrogen atom or a residue formed by eliminating one of alkoxy groups from the used acetals. In addition, when the adduct of vinyl ethers and carboxylic acid is used, the initiating terminal is a residue formed by eliminating an alkylcarbonyloxy group originated in the carboxylic acid from the adduct of vinyl ethers and carboxylic acid.

On the other hand, an end terminal, at which the polymerization of the polymer is ended, is acetal, olefin or aldehyde when water, alcohols, phenols or acetals is used. When the adduct of vinyl ether and carboxylic acid is used, the end terminal is carboxylic ester of hemiacetal. The terminals of the polymer as described above may be substituted by desirable group(s) by a known method. Examples of the desirable group(s) are a saturated hydrocarbon residue, an ether residue, an alcohol residue, a ketone residue, a nitril residue and an amid residue, among which a saturated hydrocarbon residue, an ether residue and an alcohol residue are preferable.

Although depending on materials and initiators to be used, reaction of the polymerization can be initiated within a temperature range of −80 to 150 degrees C., typically within a temperature range of −80 to 50 degrees C. The reaction of the polymerization is ended in ten seconds to ten hours after the initiation of the reaction. The reaction of the polymerization is usually conducted under the presence of solvent. The solvent is not particularly limited as long as a sufficient amount of the reaction material can be dissolved in the solvent and the solvent is inactive against the reaction. Hydrocarbon-base solvent such as hexane, benzene or toluene and ether-base solvent such as ethyl ether, 1,2-dimethoxyethane or tetrahydrofuran can be preferably used.

On the other hand, the polyvinyl ether copolymer III can be manufactured by using alkylene glycol, polyalkylene glycol or monoether thereof as the initiator and polymerizing the vinyl ether monomer in accordance with the above polymerizing method.

Examples of the alkylene glycol, the polyalkylene glycol or the monoether thereof are alkylene glycol or polyalkylene glycol such as ethylene glycol, diethylene glycol, triethylene glycol, polyethylene glycol, propylene glycol, dipropylene glycol, tripropylene glycol or polypropylene glycol, and alkylene glycol monoether or polyalkylene glycol monoether such as ethylene glycol monomethylether, diethylene glycol monomethylether, triethylene glycol monomethylether, propylene glycol monomethylether, dipropylene glycol monomethylether, or tripropylene glycol monomethylether.

The vinyl ether monomers listed in the description of the polyvinyl ether I may be used as the materials for the polyvinyl ether copolymer III. One of the above vinyl ether monomers may be singularly used or a combination of two or more thereof may be used.

In the present invention, one of the above polyvinyl ether may be singularly used or a combination of two or more thereof may be used.

For use as the base oil of the refrigerator oil composition according to the aspect of the invention, its kinetic viscosity at 40 degrees C. is preferably 1 to 400 mm²/s, more preferably 5 to 250 mm²/s.

(6) Polyalkylene Glycol (PAG)

An example of polyalkylene glycol used in the base oil of the refrigerator oil composition according to the aspect of the invention is a compound represented by the following formula (3).

$$R^9—[(OR^{10})_{m1}—OR^{11}]_{n1} \qquad (3)$$

In the formula, $R^9$ represents any one of a hydrogen atom, a hydrocarbyl group having 1 to 10 carbon atoms, an oxygen-containing hydrocarbyl group having 2 to 10 carbon atoms, an acyl group having 2 to 10 carbon atoms and a hydrocarbyl group having 2 to 6 bonding sites and 1 to 10 carbon atoms. $R^{10}$ represents an alkylene group having 2 to 4 carbon atoms. $R^{11}$ represents any one of a hydrogen atom, a hydrocarbyl group having 1 to 10 carbon atoms, an oxygen-containing hydrocarbyl group having 2 to 10 carbon atoms and an acyl group having 2 to 10 carbon atoms. n1 represents an integer of 1 to 6 while m1 is determined so that an average value of m1×n1 is in a range of 6 to 80.

In the formula (3), the hydrocarbyl groups represented by $R^9$ and $R^{11}$ each may be linear, branched or cyclic. Examples of the hydrocarbyl groups are alkyl groups such as a methyl group, an ethyl group, an n-propyl group, an isopropyl group, butyl groups, pentyl groups, hexyl groups, heptyl groups, octyl groups, nonyl groups, decyl groups, a cyclopentyl group and a cyclohexyl group. When the number of the carbon atoms contained in the hydrocarbyl group(s) exceeds 10, compatibility of the base oil with the refrigerant is deteriorated, so that a crude separation may occur. The hydrocarbyl group(s) preferably has 1 to 6 carbon atoms. An example of the oxygen-containing hydrocarbyl group is a tetrahydrofurfuryl group.

In addition, alkyl groups of the acyl groups represented by $R^9$ and $R^{11}$ each may be linear, branched or cyclic. Examples of the alkyl groups of the acyl groups are the same groups as listed in the above description of the alkyl groups. The examples of the alkyl groups of the acyl groups each have 1 to 9 carbon atoms. When the number of the carbon atoms contained in the acyl group(s) exceeds 10, compatibility of the base oil with the refrigerant is deteriorated, so that a crude separation may occur. The acyl group(s) preferably has 2 to 6 carbon atoms.

When $R^9$ and $R^{11}$ each represent a hydrocarbyl group, an oxygen-containing hydrocarbyl group or an acyl group, $R^9$ and $R^{11}$ may be mutually the same or different.

In addition, when n1 is 2 or more, plural $R^{11}$ included in one molecule may be the same or mutually different.

When $R^9$ is a hydrocarbyl group having 2 to 6 bonding sites and 1 to 10 carbon atoms, the hydrocarbyl group may be linear or cyclic. Examples of the hydrocarbyl group having 2 bonding sites are alkylene groups such as an ethylene group, a propylene group, a butylene group, a pentylene group, a hexylene group, a heptylene group, an octylene group, a nonylene group, a decylene group, a cyclopentylene group and a cyclohexylene group. An example of the hydrocarbyl group having 3 to 6 bonding sites is a residue formed by eliminating a hydroxyl group from multivalent alcohol such as trimethyl propane, glycerin, pentaerythritol, sorbitol, 1,2,3-trihydroxycyclohexane, or 1,3,5-trihydroxycyclohexane.

When the number of the carbon atoms contained in the hydrocarbyl group exceeds 10, compatibility of the base oil with the refrigerant is deteriorated, so that a crude separation may occur. The hydrocarbyl group preferably has 2 to 6 carbon atoms.

In the formula (3), $R^{10}$ represents an alkylene group having 2 to 4 carbon atoms. Examples of an oxyalkylene group, which is a repeating unit of the alkylene group, are an oxyethylene group, an oxypropylene group and an oxybutylene group. Although a plurality of oxyalkylene groups included in one molecule may be mutually the same or different, at least one oxypropylene unit is preferably included in one molecule. More preferably, an oxypropylene unit is contained in an oxyalkylene unit at a content of 50 mol % or more.

In the formula (3), n1, which represents an integer of 1 to 6, is determined in accordance with the number of the bonding sites of $R^9$. For instance, n1 is 1 when $R^9$ is an alkyl group or an acyl group while n1 is 2, 3, 4, 5 or 6 when $R^9$ is an aliphatic hydrocarbon group having 2, 3, 4, 5 or 6 bonding sites respectively. In addition, m1 is determined so that the average value of m1×n1 is in a range of 6 to 80. When the average value of m1×n1 is not in the above range, an object of the invention will not be sufficiently achieved.

The polyalkylene glycol represented by the formula (3) contains polyalkylene glycol having hydroxyl groups at its terminals. As long as the content of the hydroxyl groups is 50 mol % or less of the total terminal groups, the polyalkylene glycol containing the hydroxyl groups can be preferably used. When the content of the hydroxyl groups is more than 50 mol %, hygroscopicity is unfavorably increased, such that viscosity index is decreased.

Polyalkylene glycols such as polypropylene glycol dimethylether, polyoxyethylene, polypropylene glycol dimethylether, polypropylene glycol monobutylether and polypropylene glycol diacetate are preferable in terms of cost and effects. In a copolymer formed of polyoxypropylene (PO) unit and polyoxyethylene (EO) unit such as polyoxypropylene-polyoxyethylene copolymer dimethyl ether, a mole ratio of PO/EO is in a range of 99:1 to 10:90. Such a copolymer may be a random polymer or a block polymer.

The polyalkylene glycol represented by the formula (3) may be any one of the compounds described in detail in JP-A-02-305893.

According to the aspect of the invention, one of the polyalkylene glycol may be singularly used or a combination of two or more thereof may be used.

For use as the base oil of the refrigerator oil composition according to the aspect of the invention, the polyalkylene glycol preferably exhibits the kinetic viscosity of 1 to 400 mm$^2$/s at 40 degrees C., more preferably 5 to 250 mm$^2$/s.

(7) Polycarbonate-Base Compound

A polycarbonate-base compound used in the base oil of the refrigerator oil composition according to the aspect of the invention is preferably polycarbonate having two or more carbonate bonds in one molecule, i.e., at least one compound selected from compounds represented by the following formula (4) and compounds represented by the following formula (5).

[Chemical Formula 2]

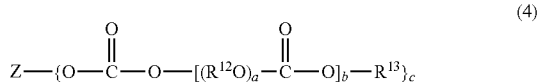

(4)

In the formula: Z represents a residue formed by eliminating a hydroxyl group from c-valent alcohol having 1 to 12 carbon atoms; R$^{12}$ represents a linear or branched alkylene group having 2 to 10 carbon atoms; R$^{13}$ represents a monovalent hydrocarbon group having 1 to 12 carbon atoms or a group containing an ether bond represented by R$^{15}$(O—R$^{14}$)d-, where R$^{15}$ represents a hydrogen atom or a monovalent hydrocarbon group having 1 to 12 carbon atoms, R$^{14}$ represents a linear or branched alkylene group having 2 to 10 carbon atoms, and d represents an integer of 1 to 20; a represents an integer of 1 to 30; b represents an integer of 1 to 50; and c represents an integer of 1 to 6.

[Chemical Formula 3]

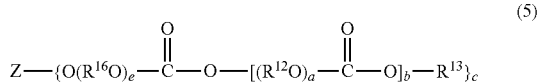

(5)

In the formula, R$^{16}$ represents a linear or branched alkylene group having 2 to 10 carbon atoms; e represents an integer of 1 to 20; and Z, R$^{12}$, R$^{13}$, a, b and c each represent the same as in the above.

In the formulae (4) and (5), Z represents a residue formed by eliminating a hydroxyl group from 1 to 6-valent alcohol having 1 to 12 carbon atoms. More preferably, Z represents a residue formed by eliminating a hydroxyl group from monovalent alcohol having 1 to 12 carbon atoms.

Examples of 1 to 6-valent alcohol having 1 to 12 carbon atoms, whose residue corresponds to Z, are: monovalent alcohol such as aliphatic monovalent alcohol exemplified by methyl alcohol, ethyl alcohol, n- or isopropyl alcohol, butyl alcohols, pentyl alcohols, hexyl alcohols, octyl alcohols, decyl alcohols and dodecyl alcohols, alicyclic monovalent alcohol exemplified by cyclopentyl alcohol and cyclohexyl alcohol, aromatic alcohol exemplified by phenol, cresol, xylenol, butylphenol and naphthol, or aromatic aliphatic alcohol exemplified by benzyl alcohol and phenethyl alcohol; divalent alcohol such as aliphatic alcohol exemplified by ethylene glycol, propylene glycol, butylene glycol, neo-pentylene glycol and tetramethylene glycol, alicyclic alcohol exemplified by cyclohexanediol and cyclohexanedimethanol, or aromatic alcohol exemplified by catechol, resorcinol, hydroquinone and dihydroxydiphenyl; trivalent alcohol such as aliphatic alcohol exemplified by glycerin, trimethylolpropane, trimethylolethane, trimethylolbutane and 1,3,5-pentanetriol, alicyclic alcohol exemplified by cyclohexanetriol and cyclohexanetrimethanol, or aromatic alcohol exemplified by pyrogallol and methylpyrogallol; and 4 to 6-valent alcohol such as aliphatic alcohol exemplified by pentaerythritol, diglycerin, triglycerin, sorbitol and dipentaerythritol.

Examples of the polycarbonate compound represented by the formula (4) are compounds represented by the formula (4-a), and examples of the polycarbonate compound represented by the formula (5) are compounds represented by the formula (5-a).

[Chemical Formula 4]

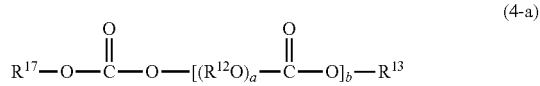

(4-a)

In the formula, R$^{17}$ represents a residue formed by eliminating a hydroxyl group from monovalent alcohol having 1 to 12 carbon atoms, and R$^{12}$, R$^{13}$, a and b each represent the same as above.

[Chemical Formula 5]

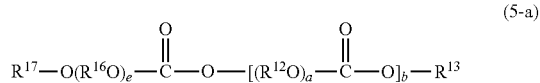

(5-a)

In the formula, R$^{12}$, R$^{13}$, R$^{16}$, R$^{17}$, a, b and e each represent the same as above.

In the formulae (4-a) and (5-a), examples of the residue represented by R$^{17}$ (i.e., the residue formed by eliminating a hydroxyl group from monovalent alcohol having 1 to 12 carbon atoms) are an aliphatic hydrocarbon group such as a methyl group, an ethyl group, an n-propyl group, an isopropyl group, butyl groups, pentyl groups, hexyl groups, octyl groups, decyl groups or dodecyl groups, an alicyclic hydrocarbon group such as a cyclopentyl group, a cyclohexyl group, a methylcyclohexyl group, a dimethylcyclohexyl group or a decahydronaphthyl group, an aromatic hydrocarbon group such as a phenyl group, tolyl groups, xylyl groups, a mesityl group or naphthyl groups, and aromatic aliphatic hydrocarbon group such as a benzyl group, a methyl benzyl group, a phenethyl group or naphthylmethyl groups. Among the above, a linear or branched alkyl group having 1 to 6 carbon atoms is preferable.

R$^{12}$ represents a linear or branched alkylene group having 2 to 10 carbon atoms. The alkylene group preferably has 2 to 6 carbon atoms. In addition, an ethylene group and a propylene group are particularly preferable in terms of performance and manufacturing simplicity. R$^{13}$ represents a monovalent hydrocarbon group having 1 to 12 carbon atoms or a group containing an ether bond represented by R$^{15}$(O—R$^{14}$)d-, where R$^{15}$ represents a hydrogen atom or a monovalent hydrocarbon group having 1 to 12 carbon atoms (preferably 1 to 6 carbon atoms), R$^{14}$ represents a linear or branched alkylene group having 2 to 10 carbon atoms, and d represents an integer of 1 to 20. Examples of the monovalent hydrocarbon group having 1 to 12 carbon atoms are the same as those listed in the description of R$^{17}$. The linear or branched alkylene group having 2 to 10 carbon atoms represented by R$^{14}$ preferably has 2 to 6 carbon atoms for the same reason as described in relation to $R^{12}$. In particular, an ethylene group and a propylene group are preferable.

$R^{13}$ preferably represents a linear or branched alkyl group having 1 to 6 carbon atoms.

While a variety of manufacturing methods is available for the above polycarbonate-base compound, a target polycarbonate-base compound can be typically manufactured by reacting a carbonate ester-forming derivative (e.g., carbonate diester, phosgene or the like) with alkylene glycol or polyoxyalkylene glycol in accordance with a known method.

According to the aspect of the invention, one of the polycarbonate-base compounds may be singularly used or a combination of two or more thereof may be used.

For use as the base oil of the refrigerator oil composition according to the aspect of the invention, the polycarbonate-base compound preferably exhibits the kinetic viscosity of 1 to 400 mm$^2$/s at 40 degrees C., more preferably 5 to 250 mm$^2$/s.

(8) Polyol Ester-Base Compound

An example of an polyol ester-base compound used in the base oil of the refrigerator oil composition according to the aspect of the invention is ester of polyol having approximately 3 to 20 diols or hydroxyl groups and aliphatic acid having approximately 1 to 24 carbon atoms. Examples of the diol are ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol and 1,12-dodecanediol. Examples of the polyol are multivalent alcohol such as trimethylolethane, trimethylolpropane, trimethylolbutane, di-(trimethylolpropane), tri-(trimethylolpropane), pentaerythritol, di-(pentaerythritol), tri-(pentaerythritol), glycerin, polyglycerin (2 to 20-meric glycerin), 1,3,5-pentanetriol, sorbitol, sorbitan, sorbitol-glycerin condensation, adonitol, arabitol, xylitol or mannitol, sugars such as xylose, arabinose, ribose, rhamnose, glucose, fructose, galactose, mannose, sorbose, cellobiose, maltose, isomaltose, trehalose, sucrose, raffinose, gentianose or melezitose, partially-etherified compounds of the above, and methyl glucoside (glycoside). Among the above, the polyol is preferably hindered alcohol such as neopentyl glycol, trimethylol ethane, trimethylol propane, trimethylol butane, di-(trimethylol propane), tri-(trimethylol propane), pentaerythritol, di-(pentaerythritol) or tri-(pentaerythritol).

While the number of the carbon atoms contained in the aliphatic acid(s) is not subject to any specific limitations, aliphatic acid(s) having 1 to 24 carbon atoms is typically used. Among the aliphatic acids having 1 to 24 carbon atoms, an aliphatic acid having 3 or more carbon atoms is preferable in terms of lubricity, an aliphatic acid having 4 or more carbon atoms is more preferable, an aliphatic acid having 5 or more carbon atoms is further more preferable, and an aliphatic acid having 10 or more carbon atoms is the most preferable. In addition, in view of compatibility of the base oil with the refrigerant, an aliphatic acid having 18 or less carbon atoms is preferable, an aliphatic acid having 12 or less carbon atoms is more preferable, and an aliphatic acid having 9 or less carbon atoms is further more preferable.

The aliphatic acid may be linear or branched. The aliphatic acid is preferably linear in terms of lubricity while the aliphatic acid is preferably branched in terms of hydrolytic stability. Further, the aliphatic acid may be saturated or unsaturated.

Examples of the aliphatic acid are linear or branched acids such as a pentane acid, a hexane acid, a heptane acid, an octane acid, a nonane acid, a decane acid, an undecane acid, a dodecane acid, a tridecane acid, a tetradecane acid, a pentadecane acid, a hexadecane acid, a heptadecane acid, an octadecane acid, nonadecane acid, an icosane acid and an olein acid, and a so-called neo-acid having quaternary a carbon atom. Specific examples of the above are a valeric acid (n-pentane acid), a caproic acid (n-hexane acid), an enanthic acid (n-heptane acid), a caprylic acid (n-octane acid), a pelargonic acid (n-nonane acid), a capric acid (n-decane acid), an olein acid (cis-9-octadecene acid), an isopentane acid (3-methylbutane acid), a 2-methylhexane acid, a 2-ethylpentane acid, a 2-ethylhexane acid, and a 3,5,5-trimethylhexane acid.

The polyol ester may be a partial ester in which some hydroxyl groups of polyol remain unesterified, a full ester in which all the hydroxyl groups are esterified or a mixture of a partial ester and a full ester. The polyol ester is preferably a full ester.

Among the above polyol esters, ester of hindered alcohol such as neopentyl glycol, trimethylol ethane, trimethylol propane, trimethylol butane, di-(trimethylol propane), tri-(trimethylol propane), pentaerythritol, di-(pentaerythritol) and tri-(pentaerythritol) is preferable because such ester is more excellent in hydrolytic stability. The polyol ester is more preferably ester of neopentyl glycol, trimethylol ethane, trimethylol propane, trimethylol butane or pentaerythritol. The polyol ester is the most preferably ester of pentaerythritol because ester of pentaerythritol is particularly excellent in the compatibility with the refrigerant and hydrolytic stability.

Preferable examples of the polyol ester-base compound are diester of neopentyl glycol and one or more aliphatic acid(s) selected from a valeric acid, a caproic acid, an enanthic acid, a caprylic acid, a pelargonic acid, a capric acid, an olein acid, an isopentane acid, a 2-methylhexane acid, a 2-ethylpentane acid, a 2-ethylhexane acid and a 3,5,5-trimethylhexane acid, triester of trimethylol ethane and one or more aliphatic acid(s) selected from a valeric acid, a caproic acid, an enanthic acid, a caprylic acid, a pelargonic acid, a capric acid, an olein acid, an isopentane acid, a 2-methylhexane acid, a 2-ethylpentane acid, a 2-ethylhexane acid and a 3,5,5-trimethylhexane acid, triester of trimethylol propane and one or more aliphatic acid(s) selected from a valeric acid, a caproic acid, an enanthic acid, a caprylic acid, a pelargonic acid, a capric acid, an olein acid, an isopentane acid, a 2-methylhexane acid, a 2-ethylpentane acid, a 2-ethylhexane acid and a 3,5,5-trimethylhexane acid, triester of trymethylol butane and one or more aliphatic acid(s) selected from a valeric acid, a caproic acid, an enanthic acid, a caprylic acid, a pelargonic acid, a capric acid, an olein acid, an isopentane acid, a 2-methylhexane acid, a 2-ethylpentane acid, a 2-ethylhexane acid and a 3,5,5-trimethylhexane acid, and tetraester of pentaerythritol and one or more aliphatic acid(s) selected from a valeric acid, a caproic acid, an enanthic acid, a caprylic acid, a pelargonic acid, a capric acid, an olein acid, an isopentane acid, a 2-methylhexane acid, a 2-ethylpentane acid, a 2-ethylhexane acid and a 3,5,5-trimethylhexane acid.

According to the aspect of the invention, one of the polyol ester-base compounds may be singularly used or a combination of two or more thereof may be used.

For use as the base oil of the refrigerator oil composition according to the aspect of the invention, the polyol ester-base compound preferably exhibits the kinetic viscosity of 1 to 400 mm$^2$/s at 40 degrees C., more preferably 5 to 250 mm$^2$/s.

(9) Ether-Base Compound

In the refrigerator oil composition according to the aspect of the invention, an ether-based compound having a structure represented by the following formula (1) is preferably used in the base oil.

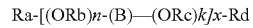   (1)

In the formula: Ra and Rd each independently represent any one of a hydrogen atom, a hydrocarbyl group having 1 to 10 carbon atoms, an oxygen-containing hydrocarbyl group having 2 to 10 carbon atoms, an acyl group having 2 to 10 carbon atoms and a hydrocarbon group having 2 to 6 bonding sites and 1 to 10 carbon atoms; Rb and Rc each represent an alkylene group having 2 to 4 carbon atoms; n and k each represent an integer of 0 to 20; and x represents an integer of 1 to 6. (B) represents a polymerization site containing 3 or more monomer units each represented by the following formula (2).

[Chemical Formula 6]

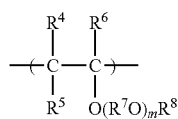

(2)

In the formula (2), $R^4$, $R^5$ and $R^6$ each represent a hydrogen atom or a hydrocarbyl group having 1 to 8 carbon atoms. $R^4$, $R^5$ and $R^6$ may be mutually the same or different.

The hydrocarbyl group specifically means an alkyl group such as a methyl group, an ethyl group, an n-propyl group, an isopropyl group, an n-butyl group, an isobutyl group, a sec-butyl group, a tert-butyl group, pentyl groups, hexyl groups, heptyl groups and octyl groups, a cycloalkyl group such as a cyclopentyl group, a cyclohexyl group, methylcyclohexyl groups, ethylcyclohexyl groups and dimethylcyclohexyl groups, an aryl group such as a phenyl group, methylphenyl groups, ethylphenyl groups and dimethylphenyl groups or an arylalkyl group such as a benzyl group, phenylethyl groups and methylbenzyl groups. $R^4$, $R^5$ and $R^6$ each preferably represent a hydrogen atom in terms of stability of synthesizing reaction.

On the other hand, $R^7$ represents a divalent hydrocarbon group having 1 to 10 carbon atoms or an ether-bonded oxygen-containing divalent hydrocarbon group having 2 to 20 carbon atoms. Examples of the divalent hydrocarbon group having 1 to 10 carbon atoms are: a divalent aliphatic group such as a methylene group, an ethylene group, a phenylethylene group, a 1,2-propylene group, a 2-phenyl-1,2-propylene group, a 1,3-propylene group, butylene groups, pentylene groups, hexylene groups, heptylene groups, octylene groups, nonylene groups and decylene groups; an alicyclic group having two bonding sites at an alicyclic hydrocarbon such as cyclohexane, methylcyclohexane, ethylcyclohexane, dimethylcyclohexane and propylcyclohexane; a divalent aromatic hydrocarbon group such as phenylene groups, methylphenylene groups, ethylphenylene groups, dimethylphenylene groups and naphthylene groups; an alkyl aromatic group having monovalent bonding sites respectively in an alkyl group portion and an aromatic group portion of alkyl aromatic hydrocarbon such as toluene, xylene and ethylbenzene; and an alkyl aromatic group having a bonding site in an alkyl group portion of polyalkyl aromatic hydrocarbon such as xylene and diethylbenzene. Among the above, the aliphatic group having 2 to 4 carbon atoms is particularly preferable in terms of the compatibility of the base oil with the refrigerant.

Preferable examples of the ether-bonded oxygen-containing divalent hydrocarbon group having 2 to 20 carbon atoms are a methoxymethylene group, a methoxyethylene group, a methoxymethylethylene group, a 1,1-bis-methoxymethylethylene group, a 1,2-bis-methoxymethylethylene group, an ethoxymethylethylene group, a (2-methoxyethoxy)methylethylene group and a (1-methyl-2-methoxy)methylethylene group. In the formula (2), m represents the number of units $R^7O$, an average value of which is 0 to 10, preferably 0 to 5. When plural m are present, the plural m may be mutually the same or different per unit. When $R^7O$ is plural, the plural $R^7O$ may be mutually the same or different. When both k and n are 0, m is an integer of 1 or more in the formula (2).

$R^8$ represents a hydrogen atom or a hydrocarbon group having 1 to 20 carbon atoms. The hydrocarbon group specifically means an alkyl group such as a methyl group, an ethyl group, an n-propyl group, an isopropyl group, an n-butyl group, an isobutyl group, a sec-butyl group, a tert-butyl group, pentyl groups, hexyl groups, heptyl groups, octyl groups, nonyl groups and decyl groups, a cycloalkyl group such as a cyclopentyl group, a cyclohexyl group, methylcyclohexyl groups, ethylcyclohexyl groups, propylcyclohexyl groups and dimethylcyclohexyl groups, an aryl group such as a phenyl group, methylphenyl groups, ethylphenyl groups, dimethylphenyl groups, propylphenyl groups, trimethylphenyl groups, butylphenyl groups and naphthyl groups, or an arylalkyl group such as a benzyl group, phenylethyl groups, methylbenzyl groups, phenylpropyl groups and phenylbutyl groups. $R^4$ to $R^8$ of one unit may be the same as or different from $R^4$ to $R^8$ of another unit.

By copolymerizing the ether-base compound having the monomer unit represented by the formula (2), lubricity, insulation properties, hygroscopicity and the like can be enhanced while a sufficient level of the compatibility with the refrigerant is retained. At this time, by suitably selecting a type of the monomer used as the material, a type of the initiator and a copolymer ratio, the level of the above performance of the refrigerator oil composition can be set at a target level. Accordingly, it is possible to obtain an oil composition capable of exhibiting required levels of lubricity and compatibility that vary depending on: types of compressors used in freezing or air-conditioning systems to which lubricating oil is applied; materials and freezing capabilities of lubricating portions; and types of refrigerants.

In the ether-base compound represented by the formula (1), (B) represents a polymerization site containing three or more monomer units each represented by the formula (2). The number of the monomer units (i.e., polymerization degree) can be suitably determined in accordance with a desired level of kinetic viscosity. The polymerization degree is typically determined so that the kinetic viscosity at 100 degrees C. becomes preferably 1 to 50 mm$^2$/s, more preferably 2 to 50 mm$^2$/s, further more preferably 5 to 50 mm$^2$, particularly preferably 5 to 20 mm$^2$/s.

Preferably in the ether-base compound represented by the formula (1), its mole ratio of carbon/oxygen is 4 or less. When the mole ratio is more than 4, the compatibility of the compound with a natural refrigerant such as carbon dioxide is deteriorated.

Instead of representing a homopolymer site containing the monomer units each represented by the formula (2), (B) in the formula (1) may represent a block copolymer site or a random copolymer site containing the monomer unit(s) represented by the formula (2) and monomer unit(s) represented by the following formula (6).

[Chemical Formula 7]

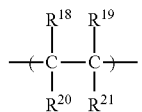

(6)

In the formula (6), $R^{18}$ to $R^{21}$ each represent a hydrogen atom or a hydrocarbon group having 1 to 20 carbon atoms. $R^{18}$ to $R^{21}$ may be mutually the same or different. Examples of the hydrocarbon group having 1 to 20 carbon atoms are the same as those of $R^8$ in the formula (2). In addition, $R^{18}$ to $R^{21}$ of one unit may be the same as or different from $R^{18}$ to $R^{21}$ of another unit.

Polymerization degree of the ether-base compound represented by the formula (1), which contains a block or random copolymer containing the monomer unit(s) represented by the formula (2) and the monomer unit(s) represented by the formula (6), may be suitably determined in accordance with a desired level of kinetic viscosity. The polymerization degree is typically determined such that the kinetic viscosity at 100 degrees C. becomes preferably 5 mm$^2$/s or more, more preferably 5 to 20 mm$^2$/s. Preferably in the ether-base compound, its mole ratio of carbon/oxygen is 4 or less. When the mole ratio is more than 4, the compatibility of the compound with a natural refrigerant such as carbon dioxide is deteriorated.

The above ether-base compound can be manufactured by polymerizing the relevant vinyl ether-base monomer or by copolymerizing the relevant hydrocarbon monomer having olefin double-bond(s) and the relevant vinyl ether-base monomer.

In view of stability of synthesizing reaction, the ether-base compound is preferably structured such that, in the formula (1), Ra represents a hydrogen atom and n equals to 0 at the first terminal of the compound while Rd represents a hydrogen atom and k equals to 0 at the second terminal of the compound.

Such an ether-base compound can be manufactured by performing such polymerization on monomer as radical polymerization, cation polymerization or radiation polymerization. For instance, by polymerizing a vinyl ether-base monomer in accordance with the following method, the obtained polymer of the vinyl ether-base monomer can exhibit a desired level of viscosity. At the initial stage of the polymerization, a compound prepared by combining Bronsted acids, Lewis acids or organometallic compounds with water, alcohols, phenols, acetals or an adduct of vinyl ethers and a carboxylic acid may be used. Examples of the Bronsted acids are hydrofluoric acid, hydrochloric acid, hydrobromic acid, hydroiodic acid, nitric acid, sulfuric acid, trichloroacetic acid and trifluoroacetic acid. Examples of the Lewis acids are boron trifluoride, aluminum trichloride, aluminum tribromide, tin tetrachloride, zinc dichloride and ferric chloride, among which boron trifluoride is particularly preferable. Examples of the organometallic compounds are diethylaluminum chloride, ethylaluminum chloride and diethylzinc.

Water, alcohols, phenols, acetals or an adduct of vinyl ethers and a carboxylic acid that is to be combined with the above may be suitably determined. Examples of the alcohols are saturated aliphatic alcohol having 1 to 20 carbon atoms such as methanol, ethanol, propanol, isopropanol, butanol, isobutanol, sec-butanol, tert-butanol, pentanols, hexanols, heptanols and octanols, unsaturated aliphatic alcohol having 3 to 10 carbon atoms such as aryl alcohol, and monoether of alkylene glycol such as ethylene glycol monomethyl ether, diethylene glycol monomethyl ether, triethylene glycol monomethyl ether, propylene glycol monomethyl ether, dipropylene glycol monomethyl ether and tripropylene glycol monomethyl ether. Examples of the carboxylic acid used for preparing the adduct of vinyl ethers and the carboxylic acid are acetic acid, propionic acid, n-butyric acid, iso-butyric acid, n-valeric acid, iso-valeric acid, 2-methyl butyric acid, pivalic acid, n-caproic acid, 2,2-dimethyl butyric acid, 2-methyl valeric acid, 3-methyl valeric acid, 4-methyl valeric acid, enanthic acid, 2-methyl caproic acid, caprylic acid, 2-ethyl caproic acid, 2-n-propyl valeric acid, n-nonane acid, 3,5,5-trimethyl caproic acid, caprylic acid and undecane acid.

According to the aspect of the invention, the mineral oil or the synthetic base oil used as the base oil may be singularly used or may be mixed in use. Irrespective of whether singularly used or mixed in use, the mineral oil or the synthetic oil is selected such that the viscosity at 100 degrees C. becomes preferably 1 to 50 mm$^2$/s, more preferably 3 to 50 mm$^2$/s, further more preferably 5 to 30 mm$^2$/s, particularly preferably 5 to 20 mm$^2$/s.

A molecular weight of the base oil is preferably in a range of 150 to 5,000 in terms of evaporation prevention, the flash point, performance as the refrigerator oil and the like, more preferably in a range of 300 to 3,000. Its viscosity index is preferably 60 or more.

The refrigerator oil composition according to the aspect of the invention is provided by adding the base oil with bisphenols. The bisphenols reacts with molecular oxygen present in minute amounts in a freezing system, thereby eliminating the molecular oxygen from the inside of the system.

Examples of the bisphenols are 4,4'-methylenebis(2,6-di-t-butylphenol), 4,4'-bis(2,6-di-t-butylphenol), 4,4'-bis(2-methyl-6-t-butylphenol), 2,2'-methylenebis(4-ethyl-6-t-butylphenol), 2,2'-methylenebis(4-methyl-6-t-butylphenol), 4,4'-butylidenebis(3-methyl-6-t-butylphenol), 4,4'-isopropylidenebis(2,6-di-t-butylphenol), 2,2'-methylenebis(4-methyl-6-nonylphenol), 2,2'-isobutylidenebis(4,6-dimethylphenol), 2,2'-methylenebis(4-methyl-6-cyclohexylphenol)-4,4'-thiobis-(3-methyl-6-t-butylphenol), 3,9-bis[1,1-dimethyl-2-[β-(3-t-butyl-4-hydroxy-5-methylphenyl)propionyloxy]ethyl], 2,4,8,10-tetraoxaspiro[5,5]undecane, and tetrakis-[methylene-3-(3',5'-di-t-butyl-4'-hydroxyphenyl)propionate]methane. The above may be singularly used or mixed in use.

Among the above bisphenols, 4,4'-butylidenebis(3-methyl-6-t-butylphenol) represented by the following formula (7), 2,2'-methylenebis(4-ethyl-6-t-butylphenol) represented by the following formula (8), 2,2'-methylenebis(4-methyl-6-t-butylphenol) represented by the following formula (9) and 4,4'-methylenebis(2,6-di-t-butylphenol) represented by the following formula (10) are particularly preferable in terms of oxidation prevention.

[Chemical Formula 8]

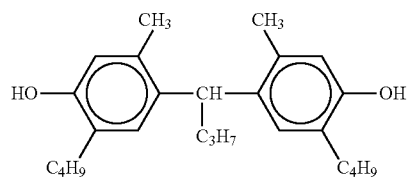
(7)

[Chemical Formula 9]

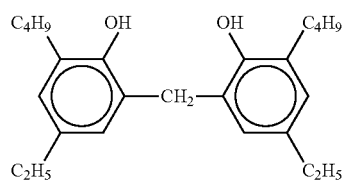
(8)

-continued

[Chemical Formula 10]

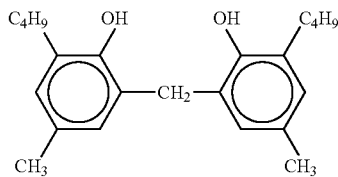

(9)

[Chemical Formula 11]

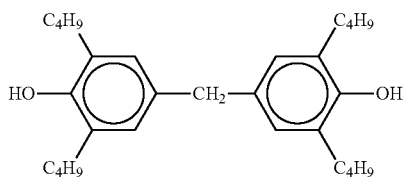

(10)

The bisphenols are contained in the composition preferably at a content of 0.1 to 10 mass % of the total amount of the composition, more preferably 0.5 to 8 mass %, further more preferably 3 to 6 mass %. When the content of the bisphenols is less than 0.1 mass %, the bisphenols cannot sufficiently function as antioxidant in a freezing system. On the other hand, when the content of the bisphenols is more than 10 mass %, the compatibility with the refrigerant may be deteriorated, so that a two-layer separation may occur.

While the refrigerant to which the refrigerator oil composition according to the aspect of the invention is applied may be saturated fluorohydrocarbon (HFC), carbon dioxide ($CO_2$), hydrocarbon (HC) or ammonia, the refrigerant is particularly preferably at least one fluorine-containing organic compound selected from compounds represented by the following molecular formula (A) in that such compounds have low global warming potential. The above-mentioned refrigerants may be mixed together in use.

$$C_pO_qF_rR_s \quad (A)$$

In the formula: R represents Cl, Br, I or hydrogen; p is an integer of 1 to 6; q is an integer of 0 to 2; r is an integer of 1 to 14; and s is an integer of 0 to 13. However, when q is 0, p is 2 to 6 and one or more unsaturated carbon-carbon bond is contained in the molecule.

The refrigerants will be specifically described below.

The saturated fluorohydrocarbon (HFC) is preferably a fluoride of alkane having 1 to 4 carbon atoms, particularly preferably a fluoride of methane or ethane having 1 to 2 carbon atoms such as trifluoromethane, difluoromethane, 1,1-difluoroethane, 1,1,1-trifluoroethane, 1,1,2-trifluoroethane, 1,1,1,2-tetrafluoroethane, 1,1,2,2-tetrafluoroethane, and 1,1,1,2,2-pentafluoroethane. The saturated fluorohydrocarbon compound may be a halide formed by halogenating the above fluoride of alkane with halogen atoms other than fluorine, an example of which is trifluoroiodomethane ($CF_3I$). One of the above saturated fluorohydrocarbon compounds may be singularly used or a combination of two or more thereof may be used.

The hydrocarbon (HC) is preferably low-boiling propane, butane, pentane or the like.

Next, the refrigerant represented by the above molecular formula (A) will be described in detail.

The molecular formula (A), which shows types of elements in the molecule and the numbers of the elements therein, represents a fluorine-containing organic compound in which the number p of carbon atoms C is 1 to 6. The fluorine-containing organic compound having 1 to 6 carbon atoms can exhibit physical and chemical properties (e.g., boiling point, freezing point, evaporative latent heat) required for refrigerant.

In the molecular formula (A), the bonding configurations of p carbon atoms represented by $C_p$ include carbon-carbon single bond, unsaturated bond such as carbon-carbon double bond, carbon-oxygen double bond and the like. Unsaturated carbon-carbon bond is preferably carbon-carbon double bond in terms of stability. While the number of unsaturated carbon-carbon bond is 1 or more, the number is preferably 1.

In the molecular formula (A), the bonding configurations of q oxygen atoms represented by $O_q$ are preferably derived from an ether group, a hydroxyl group or a carbonyl group. The number q of oxygen atoms may be 2, which is also true of when two ether groups, hydroxyl groups or the like are contained.

On the other hand, when q is 0 (i.e., no oxygen atom is contained in the molecule), p is 2 to 6 and one or more unsaturated bond such as carbon-carbon double bond is contained in the molecule. In other words, at least one of the bonding configurations of p carbon atoms represented by $C_p$ is required to be unsaturated carbon-carbon bond.

In the molecular formula (A), R represents Cl, Br, I or H. While R may represent any one of the above, R preferably represents H because such compound is less harmful to the ozone layer.

As described above, preferable examples of the fluorine-containing organic compound represented by the molecular formula (A) are an unsaturated fluorohydrocarbon compound, a fluoroether compound, a fluoroalcohol compound and a fluoroketone compound.

The above compounds will be described below.
(Unsaturated Fluorohydrocarbon Compound)

According to the aspect of the invention, the unsaturated fluorohydrocarbon compound usable as the refrigerant for freezers may be an unsaturated fluorohydrocarbon compound represented by, for instance, the molecular formula (A) where: R is H; p is 2 to 6; q is 0; r is 1 to 12; and s is 0 to 11.

Preferable examples of such an unsaturated fluorohydrocarbon compound are linear or branched chain olefin having 2 to 6 carbon atoms and a fluorinated compound of a cyclic olefin having 4 to 6 carbon atoms.

More specifically, examples of such an unsaturated fluorohydrocarbon compound are ethylene implanted with 1 to 3 fluorine atoms, propene implanted with 1 to 5 fluorine atoms, butenes implanted with 1 to 7 fluorine atoms, pentenes implanted with 1 to 9 fluorine atoms, hexenes implanted with 1 to 11 fluorine atoms, cyclobutene implanted with 1 to 5 fluorine atoms, cyclopentene implanted with 1 to 7 fluorine atoms and cyclohexene implanted with 1 to 9 fluorine atoms.

Among the above unsaturated fluorohydrocarbon compounds, an unsaturated fluorohydrocarbon compound having 2 to 3 carbon atoms is preferable. Particularly, a fluoride of propene is more preferable. Specifically, the compound represented by the molecular formula (A) is preferably a compound represented by any one of molecular formulae of $C_3HF_5$, $C_3H_2F_4$ and $C_3H_3F_3$ because such compounds have low global warming potential. Examples of the fluoride of propene are various isomers of pentafluoropropene, 3,3,3,-trifluoropropene and 2,3,3,3-tetrafluoropropene. Particularly, 1,2,3,3,3,-pentafluoropropene (HFC1225ye) and 2,3,3,3-tetrafluoropropene (HFC1234yf) are preferable because such compounds have low global warming potential.

According to the aspect of the invention, one of the above unsaturated fluorohydrocarbon compounds may be singularly used or a combination of two or more thereof may be used.

In addition, a combination of a refrigerant based on saturated fluorohydrocarbon having 1 to 2 carbon atoms and a refrigerant based on unsaturated fluorohydrocarbon having 3 carbon atoms is also preferably used. Examples of such a combination are a combination of HFC1225ye and $CH_2F_2$ (HFC32), a combination of HFC1225ye and $CHF_2CH_3$ (HFC152a) and a combination of HFC1234yf and $CF_3I$.

(Fluoroether Compound)

According to the aspect of the invention, the fluoroether compound usable as the refrigerant for freezers may be a fluoroether compound represented by, for instance, the molecular formula (A) where: R is H; p is 2 to 6; q is 1 to 2; r is 1 to 14; and s is 0 to 13.

Preferable examples of the fluoroether compound are a fluorinated compound of chain aliphatic ether having 2 to 6 carbon atoms, 1 to 2 ether bonds and linear or branched alkyl groups and a fluorinated compound of cyclic aliphatic ether having 3 to 6 carbon atoms and 1 to 2 ether bonds.

More specifically, examples of such a fluoroether compound are dimethyl ether implanted with 1 to 6 fluorine atoms, methylethyl ether implanted with 1 to 8 fluorine atoms, dimethoxymethane implanted with 1 to 8 fluorine atoms, methylpropyl ethers implanted with 1 to 10 fluorine atoms, methylbutyl ethers implanted with 1 to 12 fluorine atoms, ethylpropyl ethers implanted with 1 to 12 fluorine atoms, oxetane implanted with 1 to 6 fluorine atoms, 1,3-dioxolan implanted with 1 to 6 fluorine atoms and tetrahydrofuran implanted with 1 to 8 fluorine atoms.

Examples of the fluoroether compounds are hexafluorodimethyl ether, pentafluorodimethyl ether, bis(difluoromethyl)ether, fluoromethyltrifluoromethyl ether, trifluoromethylmethyl ether, perfluorodimethoxymethane, 1-trifluoromethoxy-1,1,2,2,-tetrafluoroethane, difluoromethoxypentafluoroethane, 1-trifluoromethoxy-1,2,2,2-tetrafluoroethane, 1-difluoromethoxy-1,1,2,2-tetrafluoroethane, 1-difluoromethoxy-1,2,2,2-tetrafluoro ethane, 1-trifluoromethoxy-2,2,2-trifluoroethane, 1-difluoromethoxy-2,2,2-tri fluoroethane, perfluorooxetane, perfluoro-1,3-dioxolan, various isomers of pentafluorooxetane, and various isomers of tetrafluorooxetane.

According to the aspect of the invention, one of the fluoroether compounds may be singularly used or a combination of two or more thereof may be used.

(Fluoroalcohol Compound)

According to the aspect of the invention, the fluoroalcohol compound represented by the general formula (A) and usable as the refrigerant for freezers may be a fluoroalcohol compound represented by, for instance, the molecular formula (A) where: R is H; p is 1 to 6; q is 1 to 2; r is 1 to 13; and s is 1 to 13.

A preferable example of the fluoroalcohol compound is a fluorinated compound of linear or branched aliphatic alcohol having 1 to 6 carbon atoms and 1 to 2 hydroxyl groups.

More specifically, examples of such an fluoroalcohol compound are methyl alcohol implanted with 1 to 3 fluorine atoms, ethyl alcohol implanted with 1 to 5 fluorine atoms, propyl alcohols implanted with 1 to 7 fluorine atoms, butyl alcohols implanted with 1 to 9 fluorine atoms, pentyl alcohols implanted with 1 to 11 fluorine atoms, ethylene glycol implanted with 1 to 4 fluorine atoms and propylene glycol implanted with 1 to 6 fluorine atoms.

Examples of the fluoroalcohol compounds are monofluoromethyl alcohol, difluoromethyl alcohol, trifluoromethyl alcohol, various isomers of difluoroethyl alcohol, various isomers of trifluoroethyl alcohol, various isomers of tetrafluoroethyl alcohol, pentafluoroethyl alcohol, various isomers of difluoropropyl alcohol, various isomers of trifluoropropyl alcohol, various isomers of tetrafluoropropyl alcohol, various isomers of pentafluoropropyl alcohol, various isomers of hexafluoropropyl alcohol, heptafluoropropyl alcohol, various isomers of difluorobutyl alcohol, various isomers of trifluorobutyl alcohol, various isomers of tetrafluorobutyl alcohol, various isomers of pentafluorobutyl alcohol, various isomers of hexafluorobutyl alcohol, various isomers of heptafluorobutyl alcohol, various isomers of octafluorobutyl alcohol, nonafluorobutyl alcohol, various isomers of difluoroethylene glycol, trifluoroethylene glycol and tetrafluoroethylene glycol. Further examples are fluoropropylene glycol such as various isomers of difluoropropylene glycol, various isomers of trifluoropropylene glycol, various isomers of tetrafluoropropylene glycol, various isomers of pentafluoropropylene glycol and hexafluoropropylene glycol, and fluorotrimethylene glycol corresponding to the fluoropropylene glycol.

According to the aspect of the invention, one of the fluoroalcohol compounds may be singularly used or a combination of two or more thereof may be used.

(Fluoroketone Compound)

According to the aspect of the invention, the fluoroketone compound usable as the refrigerant for freezers may be a fluoroketone compound represented by, for instance, the molecular formula (A) where: R is H; p is 2 to 6; q is 1 to 2; r is 1 to 12; and s is 0 to 11.

A preferable example of the fluoroketone compound is a fluorinated compound of aliphatic ketone having 3 to 6 carbon atoms and linear or branched alkyl groups.

More specifically, examples of such a fluoroketone compound are acetone implanted with 1 to 6 fluorine atoms, methylethyl ketone implanted with 1 to 8 fluorine atoms, diethyl ketone implanted with 1 to 10 fluorine atoms and methylpropyl ketones implanted with 1 to 10 fluorine atoms.

Examples of the fluoroketone compounds are hexafluorodimethyl ketone, pentafluorodimethyl ketone, bis(difluoromethyl) ketone, fluoromethyltrifluoromethyl ketone, trifluoromethylmethyl ketone, perfluoromethylethyl ketone, trifluoromethyl-1,1,2,2,-tetrafluoroethyl ketone, difluoromethylpentafluoroethyl ketone, trifluoromethyl-1,1,2,2-tetrafluoroethyl ketone, difluoromethyl-1,1,2,2-tetrafluoroethyl ketone, difluoromethyl-1,2,2,2-tetrafluoroethyl ketone, trifluoromethyl-2,2,2-trifluoroethyl ketone and difluoromethyl-2,2,2-trifluoroethyl ketone.

According to the aspect of the invention, one of the fluoroketone compounds may be singularly used or a combination of two or more thereof may be used.

The refrigerator oil composition according to the aspect of the invention may be added with at least one additive selected from an extreme pressure agent, an oiliness agent, an antioxidant, an acid scavenger, a metal deactivator and an antifoaming agent as long as an object of the invention can be achieved.

Examples of the extreme pressure agent are phosphorus-base extreme pressure agents such as phosphate ester, acid phosphate ester, phosphite ester, acid phosphite ester and amine salts thereof.

Among the above phosphorus-base extreme pressure agents, tricresyl phosphate, trithiophenyl phosphate, tris (nonylphenyl) phosphate, dioleyl hydrogen phosphate, 2-ethylhexyl diphenyl phosphate and the like are particularly preferable in terms of extreme pressure properties, friction characteristics and the like.

Another example of the extreme pressure agent is a metal salt of carboxylic acid. The metal salt of carboxylic acid is preferably a metal salt of carboxylic acid having 3 to 60 carbon atoms, more preferably a metal salt of carboxylic acid having 3 to 30 carbon atoms, particularly preferably a metal salt of aliphatic acid having 12 to 30 carbon atoms. The metal salt of carboxylic acid may be a metal salt of dimer acid or trimer acid of the aliphatic acid, or a metal salt of dicarboxylic acid having 3 to 30 carbon atoms. Among the above, a metal salt of aliphatic acid having 12 to 30 carbon atoms and a metal salt of dicarboxylic acid having 3 to 30 carbon atoms are particularly preferable.

On the other hand, a metal of the metal salt is preferably an alkali metal or an alkali earth metal. Particularly, an alkali metal is suitable.

Further examples of the extreme pressure agent other than the above-listed examples are sulfur-base extreme pressure agents such as sulfurized fat and oil, sulfurized aliphatic acid, ester sulfide, olefin sulfide, dihydrocarbyl polysulfide, thiocarbamates, thioterpenes and dialkylthiodipropionates.

The extreme pressure agent is typically contained in the composition at a content of 0.001 to 10 mass % of the total amount of the composition, more preferably at a content of 0.01 to 5 mass %, particularly preferably at a content of 0.05 to 3 mass %.

One of the above extreme pressure agents may be singularly used or a combination of two or more thereof may be used.

Examples of the oiliness agent are saturated or unsaturated aliphatic monocarboxyl acid such as stearic acid or olein acid, dimerized aliphatic acid such as dimer acid or hydrogenated dimer acid, hydroxy aliphatic acid such as ricinoleic acid or 12-hydroxystearic acid, saturated or unsaturated aliphatic monoalcohol such as lauryl alcohol or oleyl alcohol, saturated or unsaturated aliphatic monoamine such as stearylamine or oleylamine, saturated or unsaturated carboxyl acid amide such as lauric acid amide or olein acid amide, partial ester of multivalent alcohol such as glycerin or sorbitol and saturated or unsaturated monocarboxyl acid, and the like.

One of the above oiliness agents may be singularly used or a combination of two or more thereof may be used. The oiliness agent is typically contained in the composition at a content of 0.01 to 10 mass % of the total amount of the composition, preferably at a content of 0.1 to 5 mass %.

Examples of the acid scavenger are epoxy compounds such as phenyl glycidyl ether, alkyl glycidyl ether, alkylene glycol glycidyl ether (e.g., polypropylene glycol diglycidyl ether), cyclohexene oxide, α-olefin oxide and epoxidized soybean oil. Among the above, phenyl glycidyl ether, alkyl glycidyl ether, alkylene glycol glycidyl ether, cyclohexene oxide and α-olefin oxide are preferable in terms of compatibility.

An alkyl group of alkyl glycidyl ether and an alkylene group of alkylene glycol glycidyl ether each may be branched, and each typically have 3 to 30 carbon atoms, preferably 4 to 24 carbon atoms, particularly preferably 6 to 16 carbon atoms. In addition, α-olefin oxide having 4 to 50 carbon atoms in total is typically used, α-olefin oxide having 4 to 24 carbon atoms in total is more preferably used, and α-olefin oxide having 6 to 16 carbon atoms in total is particularly preferably used. According to the aspect of the invention, one of the above acid scavengers may be singularly used or a combination of two or more thereof may be used. In view of effects and sludge prevention, the acid scavenger is typically contained in the composition at a content of 0.005 to 5 mass % of the total amount of the composition, particularly preferably at a content of 0.05 to 3 mass %.

By adding such an acid scavenger to the composition, stability of the refrigerator oil composition according to the aspect of the invention can be more enhanced. By using the extreme pressure agent and the antioxidant together with the acid scavenger, the stability of the composition can be further more enhanced.

An example of the metal deactivator is N—[N',N'-dialkyl (alkyl group having 3 to 12 carbon atoms) aminomethyl] tolutriazole. Examples of the antifoaming agent are silicone oil and fluorinated silicone oil.

The refrigerator oil composition according to the aspect of the invention preferably exhibits viscosity of 1 to 400 mm$^2$/s at 40 degrees C., more preferably 3 to 300 mm$^2$/s, further more preferably 5 to 200 mm$^2$/s. Volume resistivity of the composition is preferably $10^9$ Ω·cm or more, more preferably $10^{10}$ Ω·cm or more, the upper limit of which is typically approximately $10^{11}$ Ω·cm. Friction coefficient of the composition obtained through reciprocating friction test(s) is preferably 0.119 or less, more preferably 0.117 or less, further more preferably 0.112 or less, the lower limit of which is typically approximately 0.07.

In the method of lubricating a freezer with use of the refrigerator oil composition according to the aspect of the invention, used amounts of the refrigerant listed above and the refrigerator oil composition are preferably at a mass ratio (i.e., a mass ratio of the refrigerant/the refrigerator oil composition) of 99/1 to 10/99, more preferably at a mass ratio of 95/5 to 30/70. When the used amount of the refrigerant is less than the above mass ratio, the freezing capability of the refrigerant is unfavorably deteriorated. On the other hand, when the used amount of the refrigerant is more than the above mass ratio, the lubricating capability of the refrigerator oil composition is unfavorably deteriorated.

Examples of a freezer (freezing system) to which the refrigerator oil composition according to the aspect of the invention is preferably applied are: a freezing system that includes a compressor, a condenser, an expansion mechanism (capillary tube, expansion valve) and an evaporator as essential components; a freezing system including an ejector cycle; and a freezing system including a dryer (desiccant: natural or synthetic zeolite).

The above compressor may be open type, semi-hermetic type or hermetic type. A motor used in a hermetic-type compressor is an AC motor or a DC motor. The compressor may be a rotary compressor, a scroll compressor, a swing compressor or a piston compressor. The compressor may be a small compressor of approximately 0.2. kW or a large compressor of approximately 30 kW.

In the freezing system, a water content within the system is preferably 500 ppm by mass or less, more preferably 300 ppm by mass or less. For the above sake, the desiccant filled in the above-mentioned dryer is preferably a desiccant formed of zeolite having a pore size of 0.33 nm. Examples of the zeolite are natural zeolites and synthetic zeolites. The zeolite more preferably has $CO_2$-gas absorptive capacity of 1.0% or less at 25 degrees C. and at a $CO_2$-gas partial pressure of 33 kPa. Examples of the synthetic zeolite are XH-9 and XH-600 (product names manufactured by Union Showa K.K.). By use of such desiccant, the water can be efficiently eliminated without absorption of the refrigerant during refrigerating cycle. At the same time, powderization due to deterioration of the desiccant itself can be prevented, so that the system can be free from clogging of piping with the powdered desiccant and abnormal abrasion caused by entry of the powered desiccant in slide portions of the compressor. Accordingly, the freezer can be stably in operation for a long time.

A residual air partial pressure is preferably 13 kPa or less, more preferably 10 kPa or less, further more preferably 5 kPa or less, in terms of the stability of the refrigerator oil composition.

In the freezer to which the refrigerator oil composition according to the aspect of the invention is applied, the compressor internally includes a variety of slide portions (e.g., bearing). According to the aspect of the invention, slide portions made of engineering plastic or slide portions having organic coating layers or inorganic coating layers are used in view of sealability.

The engineering plastic is preferably, for instance, a polyamide resin, a polyphenylene sulfide resin, a polyacetal resin or the like in view of sealability, slidability, wear resistance and the like.

The organic coating layers each are preferably, for instance, a coating layer of a fluorine-containing resin (e.g., coating layer of polytetrafluoroethylene), a coating layer of polyimide, a coating layer of polyamide-imide or the like in view of sealability, slidability, wear resistance and the like.

On the other hand, the inorganic coating layers each are preferably, for instance, a graphite layer, a diamond-like carbon layer, a nickel layer, a molybdenum layer, a tin layer, a chrome layer, a nitride layer, a boron layer or the like in view of sealability, slidability, wear resistance and the like. The inorganic coating layers each may be formed by plating, CVD (chemical vapor deposition) or PVD (physical vapor deposition).

The slide portions each may be made of conventional alloy such as Fe-based alloy, Al-based alloy or Cu-based alloy.

Since bisphenols are added to the base oil as an additive in the refrigerator oil composition according to the aspect of the invention, the refrigerator oil composition can scavenge molecular oxygen present in minute amounts in a freezing system, thereby preventing oxygen from reacting with chlorofluorocarbon refrigerant. Accordingly, the lubricating oil composition for refrigerator according to the aspect of the invention is stably usable in various freezers using an unsaturated chlorofluorocarbon refrigerant readily reactive particularly with oxygen for a long time. Such freezers are applied to car air-conditioners, electric driven car air-conditioners, gas heat pumps, air conditioning devices, refrigerators, vending machines, showcases, various hot-water supply systems and cooling/heating systems.

EXAMPLES

Next, the invention will be described in further detail by reference to Examples, which by no means limits the invention.

Examples 1 to 9 and Comparatives 1 to 6

Refrigerator oil compositions (sample oil) respectively structured as shown in Tables 1 to 4 were prepared. The base oil and additives used therein will be described below, of which contents will be shown in Tables 1 to 4.

<Base Oil>

(1) Polyalkylene-Glycol-Base Polymer (PAG)

Polypropylene glycol (of which both ends were methyl groups), viscosity at 40 degrees C.: 45.6 mm$^2$/s, viscosity at 100 degrees C.: 9.65 mm$^2$/s (2) Polyvinyl-Ether-Base Polymer (PVE)

Copolymer of ethylvinyl ether and butylvinyl ether, viscosity at 40 degrees C.: 70.2 mm$^2$/s, viscosity at 100 degrees C.: 8.35 mm$^2$/s <Additive>

(1) Antioxidant (1): 4,4'-butylidenebis(3-methyl-6-t-butylphenol)

(2) Antioxidant (2): 2.2'-methylenebis(4-ethyl-6-t-butylphenol)

(3) Antioxidant (3): 2.2'-methylenebis(4-methyl-6-t-butylphenol)

(4) Monophenol-base antioxidant (5) Amine-base antioxidant (6) Phosphorus-base antioxidant (7) Acid scavenger (8) Antifoaming agent Each of the above-mentioned sample oil was subjected to the following thermal stability test (JIS (Japanese Industrial Standard, hereinafter abbreviated) K 2540) for evaluating thermal stability of the sample oil. The results are shown in Tables 1 to 4.

<Thermal Stability Test>

After the sample oil had been maintained under a condition of 100 degrees C. or 170 degrees C. for 7 hours or 24 hours, the appearance of the sample oil and whether or not sludge was precipitated were visually observed, and change rates of kinetic viscosity (at 40 degrees C. and 100 degrees C.), viscosity index, acid number and mass residual ratio (%) were measured.

Methods of measuring kinetic viscosity, change rate of kinetic viscosity, acid number and mass residual ratio will be shown below.

Kinetic viscosity (mm$^2$/s): Measurement was conducted based on JIS K2283.

Change rate of kinetic viscosity (%): Calculation was based on a formula of {(kinetic viscosity after thermal stability test)/(kinetic viscosity before thermal stability test)}×100.

Acid number (mgKOH/g): Measurement was conducted by the electric potential technique in accordance with "Method of Neutralization Test of Lubricating Oil" provided in JIS K2501.

Mass residual ratio (%): Calculation was based on a formula of {(weight after thermal stability test)/(weight before thermal stability test)}×100.

TABLE 1

|  |  | Example 1 | Example 2 | Example 3 | Example 4 |
|---|---|---|---|---|---|
| Content (mass %) | PAG | 98.5 | 98.0 | 98.5 | 98.5 |
|  | Phosphorus-base Additive | 1.0 | 1.0 | 1.0 | 1.0 |
|  | Antioxidant (1) | 0.5 | 1.0 | — | — |
|  | Antioxidant (2) | — | — | 0.5 | — |
|  | Antioxidant (3) | — | — | — | 0.5 |
|  | (Sum Total) | 100.0 | 100.0 | 100.0 | 100.0 |

TABLE 1-continued

|  |  |  | Example 1 | Example 2 | Example 3 | Example 4 |
|---|---|---|---|---|---|---|
| Thermal Stability Test | Condition | Temperature (° C.) | 170 | 170 | 170 | 170 |
|  |  | Time (hr) | 24 | 24 | 24 | 24 |
|  | Result | Appearance of Sample Oil | Light Yellow | Yellow | Light Yellow | Yellow |
|  |  | Sludge Precipitation | None | None | None | None |
|  |  | Kinetic Viscosity @40° C. (mm$^2$/s) | 45.28 | 48.14 | 43.85 | 41.72 |
|  |  | Change Rate of Kinetic Viscosity @40° C. (%) | 103 | 109 | 100 | 95 |
|  |  | Kinetic Viscosity @100° C. (mm$^2$/s) | 8.823 | 9.443 | 8.143 | 7.776 |
|  |  | Change Rate of Kinetic Viscosity @100° C. (%) | 92 | 99 | 85 | 81 |
|  |  | Viscosity Index | 179 | 184 | 162 | 159 |
|  |  | Acid Number (mgKOH/g) | 0.44 | 0.31 | 0.99 | 1.52 |
|  |  | Mass Residual Ratio (%) | 94.8 | 96.2 | 94.4 | 94.7 |

TABLE 2

|  |  |  | Comparative 1 | Comparative 2 | Comparative 3 | Comparative 4 |
|---|---|---|---|---|---|---|
| Content (mass %) |  | PAG | 99.0 | 98.5 | 98.0 | 98.0 |
|  |  | Phosphorus-base Additive | 1.0 | 1.0 | 1.0 | 1.0 |
|  |  | Monophenol-base Antioxidant | — | 0.5 | 1.0 | — |
|  |  | Amine-base Antioxidant | — | — | — | 1.0 |
|  |  | (Sum Total) | 100.0 | 100.0 | 100.0 | 100.0 |
| Thermal Stability Test | Condition | Temperature (° C.) | 170 | 170 | 170 | 170 |
|  |  | Time (hr) | 24 | 24 | 24 | 24 |
|  | Result | Appearance of Sample Oil | Yellow | Yellow | Light Yellow | Dark Yellow |
|  |  | Sludge Precipitation | None | None | None | None |
|  |  | Kinetic Viscosity @40° C. (mm$^2$/s) | 62.67 | 57.72 | 46.18 | 43.15 |
|  |  | Change Rate of Kinetic Viscosity @40° C. (%) | 142 | 131 | 105 | 98 |
|  |  | Kinetic Viscosity @100° C. (mm$^2$/s) | 8.743 | 8.452 | 7.361 | 7.625 |
|  |  | Change Rate of Kinetic Viscosity @100° C. (%) | 91 | 88 | 77 | 80 |
|  |  | Viscosity Index | 113 | 119 | 122 | 146 |
|  |  | Acid Number (mgKOH/g) | 7.26 | 5.58 | 3.73 | 1.50 |
|  |  | Mass Residual Ratio (%) | 28.0 | 32.2 | 47.1 | 72.5 |

TABLE 3

|  |  | Example 5 | Example 6 | Example 7 | Example 8 | Example 9 |
|---|---|---|---|---|---|---|
| Content (mass %) | PVE | 98.1 | 97.6 | 98.1 | 97.6 | 97.6 |
|  | Phosphorus-base Additive | 1.0 | 1.0 | 1.0 | 1.0 | 1.0 |
|  | Acid Scavenger | 0.3 | 0.3 | 0.3 | 0.3 | 0.3 |
|  | Antifoaming Agent | 0.1 | 0.1 | 0.1 | 0.1 | 0.1 |
|  | Antioxidant (1) | 0.5 | 1.0 | 0.5 | 1.0 |  |
|  | Antioxidant (2) |  |  |  |  | 1.0 |
|  | (Sum Total) | 100 | 100 | 100 | 100 | 100 |

TABLE 3-continued

|  |  |  | Example 5 | Example 6 | Example 7 | Example 8 | Example 9 |
|---|---|---|---|---|---|---|---|
| Thermal Stability Test | Condition | Temperature (° C.) | 170 | 170 | 100 | 100 | 100 |
|  |  | Time (hr) | 24 | 24 | 7 | 7 | 7 |
|  | Result | Appearance of Sample Oil | Light Yellow | Light Yellow | Light Yellow | Light Yellow | Light Yellow |
|  |  | Sludge Precipitation | None | None | None | None | None |
|  |  | Kinetic Viscosity @40° C. (mm$^2$/s) | 119.2 | 133.8 | 92.16 | 93.28 | 84.09 |
|  |  | Change Rate of Kinetic Viscosity @40° C. (%) | 176 | 197 | 136 | 137 | 124 |
|  |  | Kinetic Viscosity @100° C. (mm$^2$/s) | 11.23 | 11.9 | 9.619 | 9.672 | 9.186 |
|  |  | Change Rate of Kinetic Viscosity @100° C. (%) | 135 | 143 | 116 | 116 | 111 |
|  |  | Viscosity Index | 74 | 71 | 77 | 76 | 80 |
|  |  | Acid Number (mgKOH/g) | 0.38 | 0.28 | 0.52 | 0.10 | 0.06 |
|  |  | Mass Residual Ratio (%) | 86.6 | 85.7 | 95.7 | 95.9 | 96.2 |

TABLE 4

|  |  |  | Comparative 5 | Comparative 6 |
|---|---|---|---|---|
| Content (mass %) |  | PVE | 98.3 | 98.3 |
|  |  | Phosphorus-base Additive | 1.0 | 1.0 |
|  |  | Acid Scavenger | 0.3 | 0.3 |
|  |  | Antifoaming Agent | 0.1 | 0.1 |
|  |  | Monophenol-base Antioxidant | 0.3 | 0.3 |
|  |  | (Sum Total) | 100.0 | 100.0 |
| Thermal Stability Test | Condition | Temperature (° C.) | 170 | 100 |
|  |  | Time (hr) | 24 | 7 |
|  | Result | Appearance of Sample Oil | Brown | Light Yellow |
|  |  | Sludge precipitation | None | None |
|  |  | Kinetic Viscosity @40° C. (mm$^2$/s) | 381.1 | 141.6 |
|  |  | Change Rate of Kinetic Viscosity @40° C. (%) | 561 | 209 |
|  |  | Kinetic Viscosity @100° C. (mm$^2$/s) | 21.70 | 11.96 |
|  |  | Change Rate of Kinetic Viscosity @100° C. (%) | 261 | 144 |
|  |  | Viscosity Index | 61 | 64 |
|  |  | Acid Number (mgKOH/g) | 5.01 | 5.95 |
|  |  | Mass Residual Ratio (%) | 72.5 | 89.2 |

[Evaluation Result]

Examples 1 to 9 shown in Tables 1 and 3, which correspond to the results of the thermal stability tests conducted on the lubricating oil compositions added with bisphenols as the antioxidants, exhibited no abnormal appearance in the sample oil or generated no sludge. On the other hand, Comparatives 1 to 6 shown in Table 2 and 4, in which no bisphenols was added, exhibited considerable oxidation degradation. While monophenol-base antioxidants were used in Comparatives 2, 3, 5 and 6 and an amine-base antioxidant was used in Comparative 4, none of the sample oil has been found stable.

It is understandable from the above results that the lubricating oil composition for refrigerator according to the aspect of the invention, which is added with bisphenols, is stably usable for a long time even under presence of oxygen.

INDUSTRIAL APPLICABILITY

The present invention can provide a lubricating oil composition for refrigerator with excellent stability.

The invention claimed is:

1. A composition comprising:
    a refrigerant comprising an unsaturated fluorohydrocarbon compound represented by the following formula (A)

$$C_pO_qF_rR_s \tag{A}$$

where: R represents hydrogen; p is an integer of 2 to 6; q is 0; r is an integer of 1 to 12; and s is an integer of 1 to 11, and a lubricating oil composition comprising a base oil comprising synthetic base oil, wherein said synthetic base oil is at least one selected from the group consisting of alkyl benzene, alkyl naphthalene, poly-α-olefin, polyvinyl ether, polyalkylene glycol, polycarbonate, polyol ester and an ether-base compound represented by a formula (1) as follows,

where: Ra and Rd each represent a hydrogen atom, an alkyl group having 1 to 10 carbon atoms, an acyl group having 2 to 10 carbon atoms or a hydrocarbon group having 2 to 6 bonding sites and 1 to 10 carbon atoms; Rb and Rc each represent an alkylene group having 2 to 4 carbon atoms; n and k each represent an integer of 0 to 20; x represents an integer of 1 to 6; and (B) represents a polymerization site comprising 3 or more monomer units each represented by a formula (2) as follows,

where: $R^4$, $R^5$ and $R^6$ each represent a hydrogen atom or a hydrocarbon group having 1 to 8 carbon atoms, $R^4$, $R^5$ and $R^6$ being allowed to be mutually the same or different; $R^7$ represents a divalent hydrocarbon group having 1 to 10 carbon atoms or ether-bonded oxygen-containing divalent hydrocarbon group having 2 to 20 carbon atoms; $R^8$ represents a hydrogen atom or a hydrocarbon group having 1 to 20 carbon atoms; m represents a number whose average value is in a range of 0 to 10; wherein when m is plural, the plural m are allowed to be mutually the same or different per unit; $R^4$ to $R^8$ each are allowed to be mutually the same or different per unit; wherein when $R^7O$ is plural, the plural $R^7O$ are allowed to be mutually the same or different; and when both k and n in the formula (1) are 0, m in the formula (2) is an integer of 1 or more; and 0.1 to 10 mass % of a bisphenol additive based on a total amount of said composition.

2. The composition according to claim 1, wherein
the bisphenol additive is at least one selected from the group consisting of 4,4'-methylenebis(2,6-di-t-butylphenol), 2-2'-methylenebis(4-methyl-6-t-butylphenol), 2,2'-methylenebis(4-ethyl-6-t-butylphenol) and 4,4'-butylidenebis(3-methyl-6-t-butylphenol).

3. The composition according to claim 1, wherein said refrigerant comprises an unsaturated fluorohydrocarbon having 2 or 3 carbon atoms.

4. The composition according to claim 1, wherein the base oil is further added with at least one additive selected from an extreme pressure agent, an oiliness agent, an acid scavenger, a metal deactivator and an antifoaming agent.

5. A refrigerator comprising the composition according to claim 1, wherein a slide portion of the refrigerator is made of engineering plastic or the slide portion has an organic coating layer or an inorganic coating layer.

6. The refrigerator according to claim 5, wherein said slide portion has the organic coating layer comprising at least one organic coating selected from the group consisting of polytetrafluoroethylene, polyimide, polyamide-imide or a thermosetting insulation layer comprising a resin paint comprising: a resin base material made of polyhydroxyether resin and polysulfone-base resin; and a cross-linker.

7. The refrigerator according to claim 5, wherein said slide portion has the inorganic coating layer comprising at least one inorganic coating selected from the group consisting of a graphite layer, a diamond shaped carbon layer, a tin layer, a chrome layer, a nickel layer or a molybdenum layer.

8. The composition according to claim 1, wherein said refrigerant further comprises a saturated fluorohydrocarbon compound.

9. The composition according to claim 3, wherein said unsaturated fluorohydrocarbon compound represented by formula (A) is at least one compound selected from the group consisting of $C_3HF_5$, $C_3H_2F_4$ and $C_3H_3F_3$.

10. The composition according to claim 9, wherein said unsaturated fluorohydrocarbon compound is 2,3,3,3-tetrafluoropropene (HFC1234yf).

11. The composition according to claim 9, wherein said refrigerant comprise a mixture of at least one of $C_3HF_5$, $C_3H_2F_4$ and $C_3H_3F_3$ and a saturated fluorohydrocarbon having 1 to 2 carbon atoms.

12. The composition according to claim 8, wherein said saturated fluorohydrocarbon compound is $CH_2F_2$ (HFC32) or $CHF_2CH_3$ (HFC152a).

13. The composition according to claim 1, wherein said base oil comprises a synthetic base oil, wherein said synthetic base oil is at least one oil selected from the group consisting of a polyalkylene glycol, a polyvinyl ether and the compound represented by formula (1).

* * * * *